Dec. 25, 1923.

H. O. BOEHME

SOLDERING MACHINE

Filed March 23, 1921

WITNESSES

INVENTOR
Herman O. Boehme
BY Knight
his ATTORNEYS

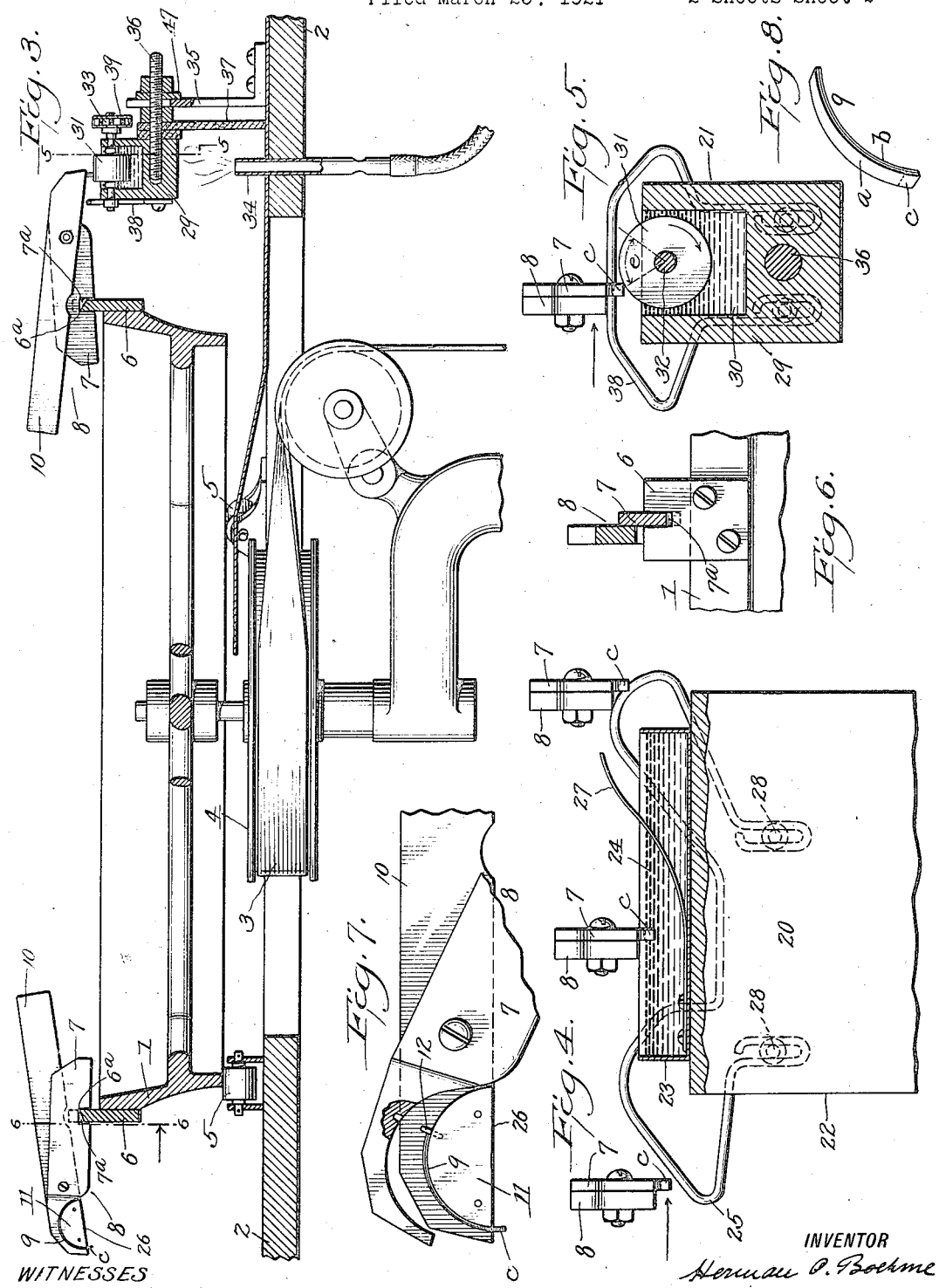

Patented Dec. 25, 1923.

1,478,696

UNITED STATES PATENT OFFICE.

HERMAN O. BOEHME, OF NEW YORK, N. Y.

SOLDERING MACHINE.

Application filed March 23, 1921. Serial No. 454,899.

*To all whom it may concern:*

Be it known that I, HERMAN O. BOEHME, a citizen of the United States, and residing in the city, county, and State of New York, have invented certain new and useful Improvements in Soldering Machines, of which the following is a complete specification illustrated in the accompanying drawings, the particular novel features of my invention being more fully pointed out in the annexed claims.

My invention relates to mechanism and means for soldering articles to each other in continuous succession for quantity production, where absolute uniformity of the soldered joints is required.

My improved machine is of particular advantage in cases where small articles are being soldered to each other which are awkward to handle during the soldering process and which therefore are apt to become unevenly soldered, be it to uneven depth or be it due to unevenness at the edges where frequently fringes or ridges of solder are likely to occur.

I have shown my improved machine as particularly applied to soldering curved ribbon contact brushes such as are used for delicate electric instruments and apparatus, without thereby, however, limiting the scope within which the device shown may be employed for the same or similar purposes in connection with articles other than ribbon brushes.

In examples of the kind illustrated it is required that two or more similarly curved ribbon elements are soldered together at one end to a definite depth in such manner that the soldering becomes solid thruout without thereby increasing the total thickness of the brushes and without forming fringes or ridges of solder at the ends of the brushes. I have found that this object can be attained by careful heating of the portions to be soldered, and by controlling carefully the amount of solder supplied and by exposing the joint for a certain length of time to a suitable temperature after it has left the solder supply means, to permit uniform distribution of the solder over the entire portion to be soldered.

In the drawings,

Fig. 3 is a transverse section thru the device shown in Fig. 1 on the line 3—3 in that figure;

Fig. 4 is a side elevation partly in section of the flux supply device, in larger scale;

Fig. 5 is a vertical section through the soldering device on the line 5—5 in Fig. 3, but in larger scale;

Fig. 6 is a detail view, partly in vertical section of the gripper support taken on line 6—6 Figure 3;

Fig. 7 shows the forward portion of the gripper in "open" position in larger scale, and Fig. 8 shows in perspective view a finished brush.

The underlying idea involved in my machine is to provide a constantly moving conveyer element such as a wheel or endless belt or the like, provided with means for attaching to it grippers into which the articles to be soldered are placed, which grippers are then moved first past a flux supply device, thereafter past a preheating device and thence past the soldering device, whereafter they can be removed from the conveyer by the operator and replaced by others charged with new articles to be soldered.

Figure 1:
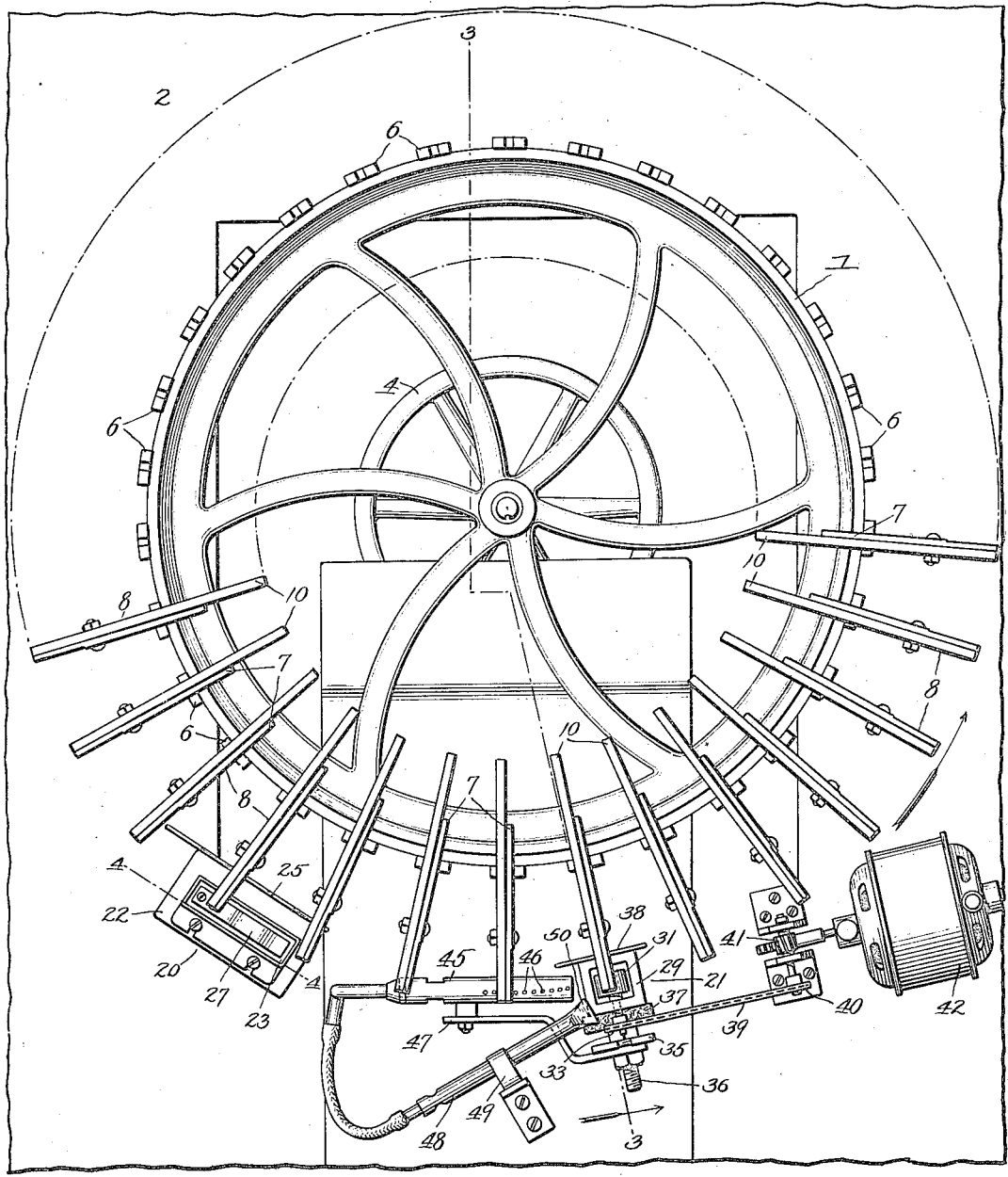
Fig. 1 is a plan view of the entire soldering device.

In Figs. 1 and 3, I have illustrated a large wheel 1, as the conveyer. This wheel is horizontally placed above an operating table 2 and operated from a suitable source of power (not shown) by means of belt 3 and pulley 4. In order to insure proper alinement of the wheel in parallel to the operating table 2, the lower rim of the wheel is supported by a number of rollers 5 mounted on the table, of which two are shown in Fig. 3. Thus any accidental vertical pressure on the wheel rim which may be exerted during the insertion or removal of the grippers cannot impair the horizontal alinement of the wheel.

At the upper periphery of wheel 1 are provided a number of gripper holders 6, preferably placed equidistant from each other and which are slotted vertically as shown in Fig. 6 in detail, such that member 7 of gripper 8, provided with a similar vertical slot 7ª at its lower edge may be inserted therein. For the purpose of this machine, to be explained later, it is necessary that the grippers 8, should have a slight vertical tilting motion on their supports 6, which is brought about by inclining the bottom of the slot in supports 6 downwardly towards the outside as is shown in Fig. 3, and by making the slot 7ª in the gripper member 7 slightly wider than the thickness of support 6 so that member 7, as it were, hangs on the upper edge 6ª of the inclined bottom of holder 6. Thus I am enabled to slightly lift the heads of the grippers without dislodging them from their supports, the grippers falling back to their normal position by the heavier weight of their outer portions after they come out of contact with the lifting means described hereafter. At the same time the grippers remain easily removable, by lifting them out of the holders.

Figure 2:
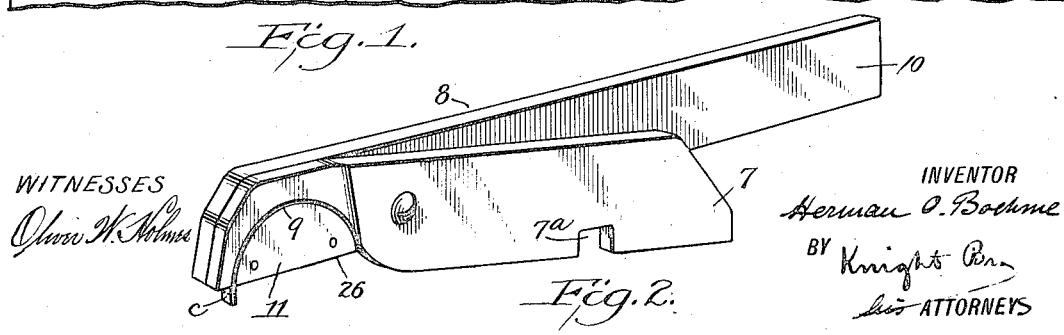
Fig. 2 is a detail perspective view in larger scale of one of the grippers.

The grippers 8 are shaped particularly to hold the curved brush elements for which the present machine is specifically designed. As may be seen from Fig. 8 the finished brush 9 consists in this instance of two constituent portions a and b of like curvature, nested into each other. They are soldered together at one of their ends as shown at c in Fig. 8, and the requirement is that the solder be solid throughout the entire contact area c without forming fringes or ridges at the edges. As shown in Fig. 7 member 10 of the gripper is provided near its outer end with a curved block 11 formed to the curvature of the brush and of the same thickness as the width of the brush. Member 7 of the gripper, pivotally attached to member 10, is complementary shaped so that when the gripper is closed as shown in Fig. 2 the two constituent brush elements a and b are held tightly together. A stopping pin 12 is provided on block 11, so as to position the two brush elements a and b when inserted into the gripper such, that only slightly more than the portion c to be soldered protrudes beyond the gripper as shown in Figs. 2 and 7. It is advisable that the protruding portion be slightly larger than the brush portion c to be soldered together, for reasons to be explained later on. The two members 7 and 10 of the gripper are pivoted to each other at such points that the large rearward extension of member 10 will always tend to close the gripper as shown in Fig. 2.

The conveyer wheel 1 rotates in the direction of the arrow in Fig. 1, and the flux supply device 20 and the soldering device 21 are mounted on the operating table 2 in the path of the brush ends c so that the grippers first encounter the flux supply 20 and then the soldering device 21.

The flux supply device 20 consists of a support 22 on which the flux container 23 is positioned at such height that when it is filled with flux 24 to the level shown the brush ends c will be immersed therein as shown in Fig. 4. In order to lift the gripper heads and brush ends over the edges of flux container 23, a guide frame 25 is provided on support 22, which stands in the line of travel of the lower edge 26 of gripper blocks 11, so that when the grippers 8 travel past the flux supply in the direction shown in Fig. 4, they encounter the inclined contour of guide 25 whereby they are lifted over the edge of the container 23 after which they are allowed to drop again until edge 26 comes into contact with the container edge, which allows the brush end c to remain immersed while the gripper passes along the container, whereafter they are lifted out again over the edge of the container by a similarly inclined portion of guide 25. In order to prevent an undue amount of flux to adhere to the brush ends when they emerge from the flux, a stripper in the form of a spring, 27, fastened to the container bottom is provided, over which the brush ends c must travel before, or at about the time, when they are lifted out of the flux, by which the excessive amount of flux is removed and allowed to flow back into the container. The proper height of guide 25 may be adjusted as shown at 28.

The soldering device 21 consists of a container 29 shown in detail in vertical section in Fig. 5 and also in Fig. 3, which may consist of any suitable good heat conductor, preferably copper. Within the hollow portion of this container is mounted a metal roller 31, preferably of copper, on a shaft 32 journalled in the container walls, and at one end of which is fixed sprocket wheel 33.

The container is filled with solder 30 which is kept liquid and at the proper temperature by means of a Bunsen burner 34 or other suitable means. The roller 31 is mounted in the container at such height that a portion of its periphery protrudes beyond the upper edge of the container, the whole device being mounted on a bracket 35 secured to the operating table 2 and the container being adjustable on the bracket as to height by means of adjusting screw 36. An asbestos wall 37 is preferably placed between the bracket and the heat supply 34 to shield the former from the flames. The soldering device is placed into the line of travel of the brush ends c so that these ends must pass over roller 31, adjacent to which an adjustable guide 38 is provided on container 29 for the purpose of lifting grippers 8 to the desired height before they encounter roller 31, so that the corners of the brush ends encounter and leave the roller at a definite point of its periphery, and so that the brush edge remains in contact with the roller throughout a definite angle, for instance angle e (Fig. 5). As soon as the individual grippers 8 have passed the roller they slide down the other end of the guide 38 and assume their normal level, at which they ordinarily travel with conveyer wheel 1. It is essential that the peripheral speed of roller 31 should have a definite relation to the speed at which brush ends c travel past the soldering device. This relation depends upon the consistency of the solder and on the amount to be applied to the joint. I have found that in order to obtain a perfect joint it is not sufficient that the brush ends c, when encountering roller 31, rotate the latter so that adhering solder is supplied to the brush ends. In fact it would be a disadvantage to cause the brush ends c, as it were, to operate the roller, because thereby they would always pick up too much solder, with the result that small ridges of solder are formed on the outside of the brush edges, which is detrimental for the purpose for which the brushes are used. In order to avoid this disadvantage I rotate roller 31 in the direction of the arrow positively by outside means, such as are shown for instance in Fig. 1. As will be seen from this figure, sprocket wheel 33 mounted on the shaft 32 of roller 31 as described before, is operated thru chain drive 39 from a sprocket wheel 40 connected to a worm gear drive 41 operated by a small motor 42. The speed of this motor and aforementioned worm gear 41 are chosen so that the desired relation between the roller speed and the brush speed is obtained.

This positive drive of the solder supply roller has the further advantage that this roller continuously moves, so long as the device is operated, and thus also rotates intermediate the time at which two successive grippers pass the roller. This continuous rotation has the advantage that continuously fresh solder is picked up by the roller from the liquid supply 30 whereby the film of solder on the roller remains of substantially uniform thickness and quality.

In order to obtain a perfect solder joint the heat supplied to the brush ends c by the solder supply roller is not sufficient. I find it necessary and of advantage to not only preheat the brush ends before they reach the soldering device but to also supply an additional amount of heat directly to the brush ends during the soldering process and subsequently thereto. To attain this purpose I have provided the following heating means:

Between the flux supply 20 and the soldering device 21, as illustrated in Fig. 1, is disposed a Bunsen burner 45 which is horizontally disposed and closed at its end. A number of small holes 46 are provided in the cylindrical surface of burner 45, preferably in line with the circular path along which brush ends c travel. These holes are comparatively small so that only small flames will emanate therefrom, and the Bunsen burner 45 is adjusted a sufficient distance below the brushes to only heat them to the desired degree. For the purpose of such adjustment the burner 45 is attached to a bracket 47 which in turn is fastened to bracket 35 which carries the solder supply device. Burner 45 extends sufficiently close to the soldering device 21 so that the brushes encounter the soldering roller almost immediately after they have passed the burner.

In addition to this preheating device I provide a second Bunsen burner 48 fastened on an adjustable bracket 49. The mouth 50 of this burner is flattened out so that a broad flame will emanate therefrom, which is horizontally adjusted so that the broad flame fills the gap between burner 45 and the soldering device 21, and besides plays over the solder supply roller 31 and somewhat beyond. Thus when the brush ends c have passed burner 45 they remain exposed to a suitable heat before they reach the solder roller 31 and during the soldering process and also for a short time after they have left the soldering roller. This arrangement I find insures a perfect soldered joint of uniform quality without containing an excess amount of solder which might unduly increase the thickness of the brush at the joint, and without producing elements at the joint, and without producing fringes or ridges of solder at the brush edges.

It has been previously stated that the brush portions c to be joined protrude slightly more than their own length beyond the grippers. The purpose of this expedient is to permit the solder to flow up the desired depth into the joint, beyond which however the solder cannot flow, because the heat supplied to the brush ends is quickly absorbed by the heavy metal grippers.

After the brushes have left the soldering device, an operative now removes the grippers from the transporting wheel 1 and then removes the finished brush therefrom, whereafter he may recharge the gripper with a new pair of unsoldered brush elements.

I claim:—

1. A machine for automatically soldering articles together, comprising flux applying means adapted to supply flux to the articles, a soldering device for supplying solder to said articles, gripping means for holding the articles in position relatively to each other and conveying means adapted to receive the gripping means and to carry them to the flux and soldering applying means, and means for heating the articles on their way to the soldering means and during the soldering operation, said gripping means having suitable shape and sufficient heat conductivity to keep those portions of the articles chilled on which no solder is desired.

2. In a soldering machine of the character described grippers for holding articles to be soldered in relative position to each other, said grippers consisting each of two members, pivotally attached to each other and shaped at their ends to fit the contour of the articles, the free ends of said members being of suitable length to cause one member by its weight to close the gripper when the free end of the other member is supported, flux applying means and soldering means and a conveyer, adapted to pivotally and removably support said grippers and to carry them past said flux and solder applying means.

3. In a soldering machine of the character described for soldering curved elements to each other, grippers consisting each of two members pivotally attached to each other, one member having at its end a block correspondingly curved to support said elements, the other member being of complementary shape to hold said elements on their support and to remain in tight contact with them when the gripper is closed, the free ends of said members being of suitable length to cause one member by its weight to close the gripper when the free end of the other member is supported, a stop on one of said members for determining the length which the elements protrude beyond the gripper head, flux supply means, soldering means and conveying means, the latter being adapted to pivotally and removably support one of said gripper members and to carry the gripper heads past said flux and solder supply means.

4. In a machine for soldering articles together, grippers for holding the articles in soldering position, a conveyer for supporting and conveying said grippers in a prescribed path and a solder applying device located in the path of the articles, said device comprising a solder container, a roller journalled therein and protruding with a portion of its periphery beyond the container edge, means for rotating said roller continually means for heating said container and means for guiding said grippers over said roller in the direction in which the roller periphery moves and at a suitable speed relatively to the roller speed to cause the articles contained therein to remain in contact with said roller over a predetermined length of its periphery, and to pick up only the amount of solder which may be held between the article portions to be joined.

5. In a machine for soldering articles together, grippers for holding the articles in soldering position, a conveyer for supporting and conveying said grippers in a prescribed path and a solder applying device located in the path of the articles, said device comprising a solder container, a roller journalled therein and protruding with a portion of its periphery beyond the container edge, means for rotating said roller continually, means for heating said container and means for guiding said gripper over said roller to cause the articles contained therein to remain in contact with said roller over a predetermined length of its periphery and means for supplying heat directly to the article portions to be soldered during and subsequently to the soldering operation.

6. In a machine for soldering articles together, grippers for holding the articles in soldering position, a conveyer for supporting and conveying said grippers in a prescribed path and a solder applying device located in the path of the articles, said device comprising a solder container, a roller journalled therein and protruding with a portion of its periphery beyond the container edge, means for rotating said roller continually means for heating said container, and means for guiding said grippers over said roller to cause the articles contained therein to remain in contact with said rollers over a predetermined length of its periphery and a row of Bunsen jets arranged in the approaching path of the article to said roller for preheating the article portions to be soldered and a separate Bunsen jet disposed to play over the protruding periphery of said roller and a suitable distance beyond for heating said article portions during and a suitable time after the soldering operation.

HERMAN O. BOEHME.